United States Patent
Kim et al.

(10) Patent No.: US 9,001,783 B2
(45) Date of Patent: Apr. 7, 2015

(54) DUAL BASE STATIONS FOR WIRELESS COMMUNICATIONS SYSTEMS

(75) Inventors: Hongseok Kim, Austin, TX (US); Xiangying Yang, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 877 days.

(21) Appl. No.: 12/494,145

(22) Filed: Jun. 29, 2009

(65) Prior Publication Data

US 2010/0172291 A1 Jul. 8, 2010

Related U.S. Application Data

(60) Provisional application No. 61/142,582, filed on Jan. 5, 2009.

(51) Int. Cl.
*H04W 76/00* (2009.01)
*H04W 48/20* (2009.01)
*H04W 76/02* (2009.01)

(52) U.S. Cl.
CPC .............. *H04W 48/20* (2013.01); *H04W 76/02* (2013.01)

(58) Field of Classification Search
CPC ............................... H04W 48/20; H04W 52/02
USPC .................................................. 370/328, 331
See application file for complete search history.

(56) References Cited

U.S. PATENT DOCUMENTS

| | | | |
|---|---|---|---|
| 6,477,376 B1* | 11/2002 | Carter | 455/446 |
| 2002/0191561 A1* | 12/2002 | Chen et al. | 370/331 |
| 2005/0094588 A1 | 5/2005 | Wentink | |
| 2007/0110016 A1 | 5/2007 | Shen et al. | |
| 2008/0108369 A1 | 5/2008 | Visotsky et al. | |
| 2008/0165709 A1 | 7/2008 | Soliman | |
| 2009/0073913 A9* | 3/2009 | Wentink | 370/315 |
| 2010/0142458 A1* | 6/2010 | Mark | 370/329 |
| 2010/0296475 A1* | 11/2010 | Visotsky et al. | 370/329 |
| 2012/0071194 A1* | 3/2012 | Harel | 455/522 |

FOREIGN PATENT DOCUMENTS

| | | |
|---|---|---|
| EP | 1890510 A2 | 2/2008 |
| JP | 2005-348433 A | 12/2005 |
| JP | 2006-140705 A | 6/2006 |
| JP | 2007-143138 A | 6/2007 |

(Continued)

OTHER PUBLICATIONS

International Search Report and Written Opinion from PCT/US2010/020164 mailed Jul. 29, 2010, 9 pgs.

(Continued)

*Primary Examiner* — Donald Mills
*Assistant Examiner* — Henry Baron
(74) *Attorney, Agent, or Firm* — Alpine Technology Law Group LLC

(57) ABSTRACT

A network apparatus comprises a controller to determine a first base station for transmitting data and to determine a second different base station for receiving data. In one embodiment, the network apparatus further comprises a transceiver to transmit data to the first base station while associated with the second base station. The transceiver is operable to receive data from the second base station while associated with the first base station.

17 Claims, 7 Drawing Sheets

(56) References Cited

FOREIGN PATENT DOCUMENTS

| JP | 2008-048236 A | 2/2008 |
|---|---|---|
| JP | 2011193466 A | 9/2011 |
| WO | 2006/023771 A2 | 3/2006 |
| WO | WO 2006/070178 | 7/2006 |
| WO | WO 2010/078598 | 7/2010 |
| WO | 2010/078598 A3 | 9/2010 |

OTHER PUBLICATIONS

International Preliminary Report on Patentability for International Patent Application No. PCT/US2010/020164, Mailed Jul. 14, 2011, 7 pages.

Office Action Received for Japan Patent Application No. 2011-544665, Mailed on Oct. 30, 2012, 2 pages of Office Action and 2 pages of English Translation.

Office Action Received for Korean Patent Application No. 10-2011-7018155 Mailed on Oct. 22, 2012, 5 pages of Office action and 4 pages of English translation.

Office Action received for Chinese Patent Application No. 201080010367.1, mailed on Jul. 24, 2013, 9 Pages of Office Action and 19 pages of English Translation.

Office Action received for Chinese Patent Application No. 201080010367.1, mailed on Mar. 27, 2014, 17 pages of English Translation and 7 pages of Chinese Office Action.

Notice of Grant received for Japanese Patent Application No. 2011-544665, mailed on Mar. 5, 2013, 1 page of Notice of Grant only.

\* cited by examiner

DUAL BASE STATIONS FOR WIRELESS COMMUNICATIONS SYSTEMS

CROSS-REFERENCE TO RELATED APPLICATIONS

This application claims the benefit of U.S. Provisional Application No. 61/142,582, filed on Jan. 5, 2009, entitled "Advanced Wireless Communication Systems and Techniques", and the contents of which incorporated herein by reference as if set forth herein in full.

FIELD OF THE INVENTION

Embodiments of the invention relate to data communication; more particularly, embodiments of the invention relates to managing connections to base stations.

BACKGROUND OF THE INVENTION

It is becoming increasingly common to find broadband wireless networking capabilities (e.g., IEEE 802.11, 802.16e, etc.) in mobile devices. In many network environments, a network device establishes communication with an access point, e.g., a base station of a cellular network, for both uplink and downlink access.

Wireless communication interfaces may use up a large portion of total power supply available to mobile devices operating on batteries. Power management schemes are used in conjunction with network devices to extend the battery lifetime of mobile communication devices.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
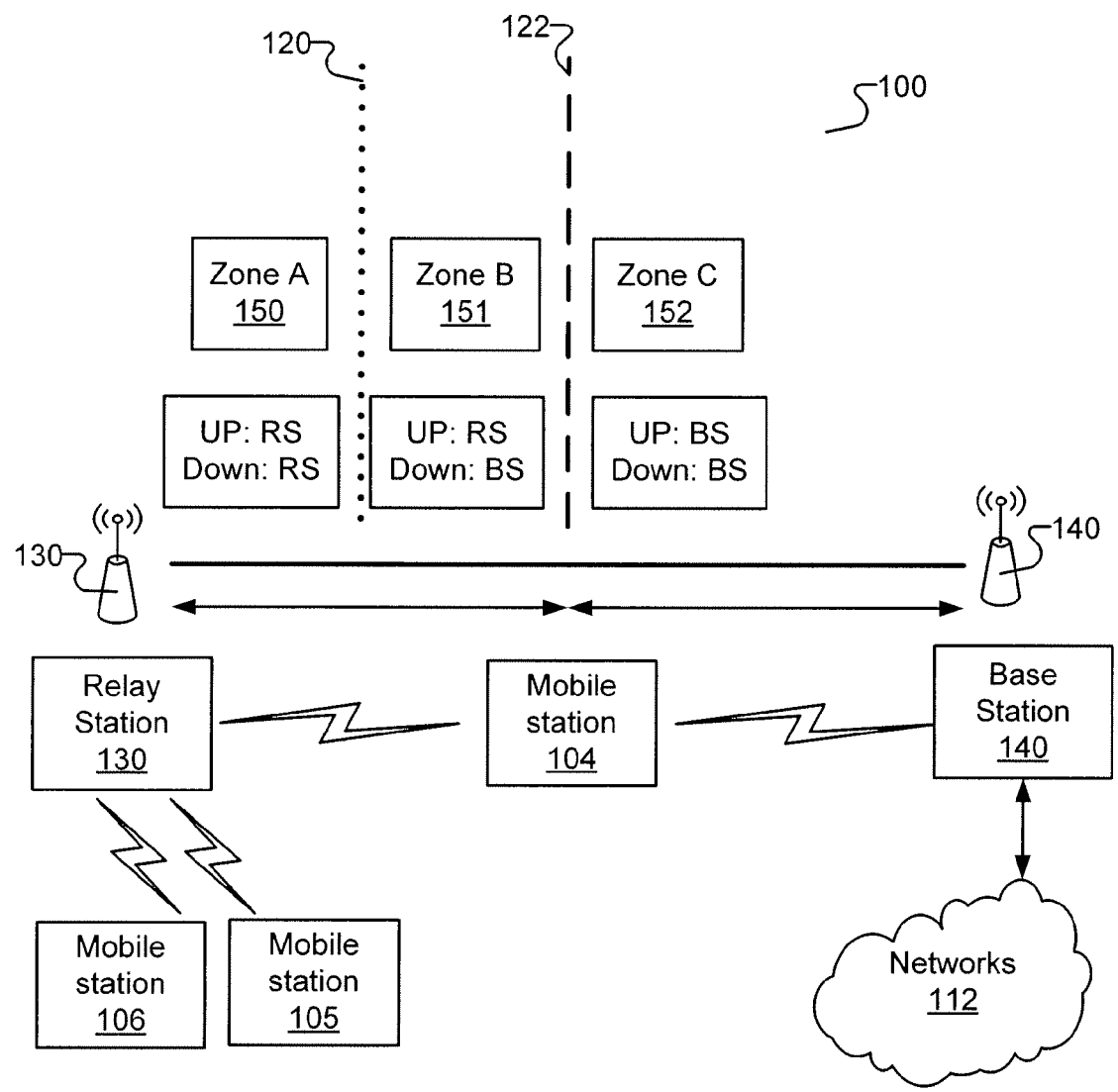
FIG. 1 is a block diagram showing dual base stations system in accordance with one embodiment of the invention.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for determining base stations for wireless network transmissions. Specifically, determining a base station for transmitting data (uplink) based on distances of base stations is primarily discussed in reference to mobile devices. However, the methods and apparatus for determining a base station for an uplink transmission based on distances of base stations is not so limited, as it may be implemented on or in association with any integrated circuit device or system, such as cell phones, personal digital assistants, embedded controllers, mobile platforms, desktop platforms, and server platforms, as well as in conjunction with other resources, such as hardware/software threads.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs, routers, relay stations, repeaters, analog repeaters, and amplify and forward repeaters. Further, the radio systems within the scope of the invention may include cellular radio telephone systems, satellite systems, personal communication systems (PCS), two-way radio systems, and two-way pagers as well as computing devices including radio systems such as personal computers (PCs) and related peripherals, personal digital assistants (PDAs), personal computing accessories, and all existing and future arising systems which may be related in nature and to which the principles of the inventive embodiments could be suitably applied.

While the following detailed description may describe example embodiments of the present invention in relation to wireless metropolitan area networks (WMANs) or other wireless wide area networks (WWANs), the embodiments are not limited thereto and can be applied to other types of wireless networks where similar advantages may be obtained. Such networks for which inventive embodiments may be applicable specifically include, wireless personal area networks (WPANs), wireless local area networks (WLANs), WWANs such as cellular networks, or combinations of any of these networks. Further, inventive embodiments may be discussed in reference to wireless networks utilizing Orthogonal Frequency Division Multiplexing (OFDM) modulation. However, the embodiments of present invention are not limited thereto and, for example, the embodiments can be implemented using other modulation or coding schemes where suitably applicable.

Overview

FIG. 1 is a block diagram showing dual base stations system in accordance with one embodiment of the invention. In one embodiment, a network apparatus associates with two different base stations for uplink (transmitting data from the apparatus) and downlink transmissions (receiving data by the apparatus) to improve downlink capacity and to reduce uplink transmit power of the network apparatus.

Referring to FIG. 1, in one embodiment, communication network 100 comprises relay station 130, base station 140, mobile stations 104-106, and networks 112. In one embodiment, boundary 120 and boundary 122 logically splits coverage area of mobile station 104 into 3 zones (zone A 150, zone B 151, and zone C 152).

It will be appreciated by those of ordinary skill that FIG. 1 is a linear model of communication network 100. The coverage area is shown as divided linearly by boundaries 120 and 122 which are not necessarily linear in an actual network. For example, in some embodiments, boundary 120 forms a part of a network cell boundary. In one embodiment, boundary 122 is a locus of points approximately equidistant from relay station 130 and base station 140. Boundary 120 is a locus of points with approximately equal downlink signal strength values (or receive power values) at the mobile station 104 with respect to receiving data from relay station 130 and from base station 140. Zones (zones 150-152) and boundaries (e.g., boundaries 120 and 122) are shown in block diagram form, rather than in detail, in order to avoid obscuring embodiments of the present invention.

In one embodiment, base station 140 is an access point. In one embodiment, base station 140 performs association authentication and time/frequency resource allocation. In one embodiment, base station 140 is either main, relay, or remote base station. A main base station is connected with the wired Ethernet. A relay base station relays data between remote base stations, wireless clients, or other relay stations to a base station. A remote base station accepts connections from wireless clients and passes the clients to relay or main stations.

In one embodiment, relay station 130 amplifies and forwards communications from mobile station 104 to network 112. In one embodiment, relay station 130 has capabilities similar to base station 140. In one embodiment, relay station 130 acts a base station to provide backward-compatible functionalities to legacy subscriber stations. In this case, backhaul link(s) between base station 140 and relay station 130 is concealed from legacy subscriber stations. In one embodiment, relay station 130 is a base station similar to base station 140. In one embodiment, relay station 130 is not connected directly to a core network (e.g., 112) by electrical or wires or optical cables but rather are connected to the core network via a wireless backhaul (not shown) to base station 140. In one embodiment, relay station 130 is referred to as a "micro" or "pico" base station.

In one embodiment, mobiles stations 104-106 are also known as subscriber stations. In one embodiment, mobile stations 104-106 include any combination of stationary devices, mobile devices, and portable wireless communication devices, such as, for example, personal digital assistants (PDAs), laptops or portable computers with wireless communication capability, web tablets, wireless telephones, wireless headsets, pagers, instant messaging devices, digital cameras, televisions, medical devices (e.g., a heart rate monitor, a blood pressure monitor, etc.), or other devices that communicate information wirelessly.

In one embodiment, base station 140 communicates, using radio-frequency (RF) signals, with mobile stations 104-106 allowing mobile stations 104-106 to communicate amongst each other as well as allowing mobile stations 104-106 to communicate with external networks 112 (e.g., the Internet).

In one embodiment, mobile station 104 is a standard range mobile station. In one embodiment, mobile station 106 is an extended range mobile station. An extended range encompasses a much larger geographic area than the standard range. In one embodiment, a standard range extends up to a couple hundred meters in an unobstructed environment (e.g., outdoors) from base station 140 while the extended range extends up to a thousand or more meters in an unobstructed environment from base station 140. In one embodiment, values of transmit power and antenna heights of wireless transceivers in relay stations 130 are less than those of base stations 140, whereas those of mobile stations 104 are even less.

In one embodiment, in conjunction with heterogeneous overlay network deployment, mobile station 104 uses two different base stations (e.g., base station 140, relay station 130) for downlink and uplink transmissions. In one embodiment, rather than selecting one access point only based on signal to interference/noise ratio (SINR) at the mobile station 104, mobile station 104 associates with two different access points for uplink and downlink transmissions to improve the downlink capacity and to reduce the uplink transmit power of mobile station 104. In one embodiment, SINR at the mobile station 104 is measured with respect to downlink reference signals (e.g., preamble and pilot).

In one embodiment, mobile station 104 selects the two access points based on two criteria. In one embodiment, a first criterion is based on a value indicative of maximum downlink SINR (maxSINR) of signal received at mobile station 104. A higher downlink maxSINR results in a higher downlink capacity (to mobile station 104). In one embodiment, a second criterion is based on minimum uplink transmit power at the mobile station 104 for an uplink transmission (from mobile station 104). In one embodiment, a minimum uplink transmit power is referred to as a required transmission power. A lower uplink transmit power consumption extends battery lifetime of mobile station 104. In one embodiment, mobile station 104 selects a downlink transmission based on the first criterion and selects an uplink transmission based on the second criterion.

In one embodiment, if base stations 130 and 140 are similar in antenna configuration, channels from mobile station 104 to these two base stations show similar scaling properties (for example, channel gain changes in the distance from a base station) such that selecting a minimum uplink transmission power is approximated by selecting a base station with the closest distance. In one embodiment, if the above conditions do not hold, the uplink transmission power is affected by factors including distances, the configuration of an antenna, etc.

In one embodiment, a minimal uplink transmission power is estimated by considering the ratio of a downlink reference signal's receive power (e.g. SINR) at mobile station 104 versus a known transmission power (for example, from base station broadcast), assuming that uplink/downlink channels are symmetry in terms of channel gains. In one embodiment, mobile station 104 performs explicit signaling with any target base station to obtain necessary information related to uplink transmission power. The following examples related to "closest distance" are described by way of illustration and is in no way intended to be considered limiting.

In one embodiment, SINR is defined as signal power divided by a sum of interference power and noise power, wherein signal power is a product of transmission power and channel gain. In one embodiment, a transmission capacity is an upper bound on the amount of information that is reliably transmitted over a communication connection (in terms of bit per second). In one embodiment, a transmission capacity of a connection is approximately equal to a value of bandwidth multiplied by log(1+SINR). In one embodiment, a higher SINR results in a higher transmission capacity as explained above. In one embodiment, a higher transmission power results in a higher SINR and therefore higher transmission capacity.

In one embodiment, if downlink and uplink transmissions (also referred to as channels, connections, etc.) are symmetric and all base stations (access points) use a same transmit power value, selecting a base station based on either a downlink maxSINR value or a minimum uplink transmit power value yields to the same base station. In one embodiment, if base stations operate on different values of transmit power (in a heterogeneous network, e.g., IEEE 802.16m network), mobile station 104 will associate with two different base stations (one for uplink transmission and one for downlink transmission) when mobile station 104 operates in a dual access point zone (DAZ). In one embodiment, transmit power of a base station 140 is 46 dBm, whereas, transmit power of relay station 130 is 36 dBm in accordance with an 802.16m network.

In one embodiment, the transmit power of relay station 130 is lower than the transmit power of base station 140. Referring to the example shown in FIG. 1, cell boundary 120 is closer to relay station 130 because cell boundary 120 is selected based on maximum received SINR values of different base stations measured with respect to mobile station 104. On the other hand, if mobile station 104 selects a base station based on minimum transmit power, mobile station 104 selects a closer base station (in terms of distance) such that the cell boundary is at the middle (as indicated by boundary 122).

In one embodiment, cell boundary 120 is referred to herein as a downlink cell boundary. In one embodiment, cell boundary 122 is referred to herein as an uplink cell boundary.

In one embodiment, mobile station 104 associates with the same base station (i.e., relay station 130) for uplink and downlink transmissions while mobile station 104 is located in zone A 150. In one embodiment, mobile station 104 associates with the same base station (i.e., base station 140) for uplink and downlink transmissions while mobile station 104 is located in zone C 152. In one embodiment, mobile station 104 associates with the two base stations (i.e., relay station 130 for an uplink transmission and base station 140 for a downlink transmission) while mobile station 104 is located in zone B 151. In one embodiment, zone B 151 is also referred to herein as a dual AP zone (DAZ), where mobile station 104 associates with two different access points.

In one embodiment, if the cell coverage of base station 140 and relay station 130 is determined based on a downlink perspective only (i.e., maximum received SINR at the mobile station 104), mobile station 104 selects a base station with a better downlink transmission capacity. The selected base station however may not be a better base station for uplink transmission if the distance of the base station from mobile station 104 is greater and mobile station 104 needs to use high transmit power to establish a uplink connection to the base station.

In one embodiment, a significant gain on system capacity and power saving at mobile station 104 are observed if mobile station 104 is able to use different base stations when operating in DAZ. In one embodiment, if the difference of transmit power of base station 140 and relay station 130 is 10 dB, mobile station 104 is able to save up to 70% of uplink transmit power on average, if compared to performing both downlink/uplink communications with base station 140.

Communication Systems

In one embodiment, base station 140 is a Wireless Fidelity (WiFi) access point. In one embodiment, base station 140 operates in accordance with one or more of the Institute of Electrical and Electronic Engineers (IEEE) 802.11 standards (e.g., IEEE 802.11(a), 802.11(b), 802.11(g), 802.11(h), and 802.11(n)), variations, or evolutions thereof.

In one embodiment, communication network 100 is a broadband wireless access (BWA) network and base station 140 is a Worldwide Interoperability for Microwave Access (WiMax) base station or other broadband communication station. In one embodiment, base station 140 operates in accordance with one or more of the Institute of Electrical and Electronic Engineers (IEEE) 802.16 standards, variations, or evolutions thereof.

In one embodiment, communication network 100 is a wireless local area network (WLAN). In one embodiment, wireless communication network 100 is a wireless personal area network (WPAN), a wireless metropolitan area network (WMAN), a wireless wide area network (WWAN), 3GPP2, 3G LTE, or 4G network. In one embodiment, mobile stations 104-106 operate in a carrier sense multiple access (CSMA) mode.

In one embodiment, base station 140 communicates with mobile stations 104-106 using spread-spectrum signals within one or more frequency spectrums. In other embodiments, base station 140 communicates using orthogonal frequency division multiplexed (OFDM) communication signals within one or more frequency spectrums. In one embodiment, base station 140 communicates with mobile stations 104-106 selectively using either spread-spectrum signals or OFDM communication signals. The OFDM signals comprise a plurality of orthogonal subcarriers.

In one embodiment, the frequency spectrums used by base station 140 comprise either a 5 GHz frequency spectrum or a 2.4 GHz frequency spectrum. In one embodiment, 5 GHz frequency spectrum includes frequencies ranging from approximately 4.9 to 5.9 GHz, and 2.4 GHz spectrum includes frequencies ranging from approximately 2.3 to 2.5 GHz, although the scope of the invention is not limited in this respect, as other frequency spectrums are also equally suitable. In some BWA network embodiments, the frequency spectrum for communications comprises frequencies between 2 and 11 GHz, although the scope of the invention is not limited in this respect.

In one embodiment, antennas of base station 140 and antennas of mobile stations 104-106 comprise one or more directional or omnidirectional antennas including for example, dipole antennas, monopole antennas, patch antennas, loop antennas, microstrip antennas, or other types of antennas suitable for transmission of RF signals. In one embodiment, base station 140, and mobile stations 104-106 use two or more antennas each. In one embodiment, instead of the two or more antennas, a single antenna with multiple apertures is used.

Figure 2:
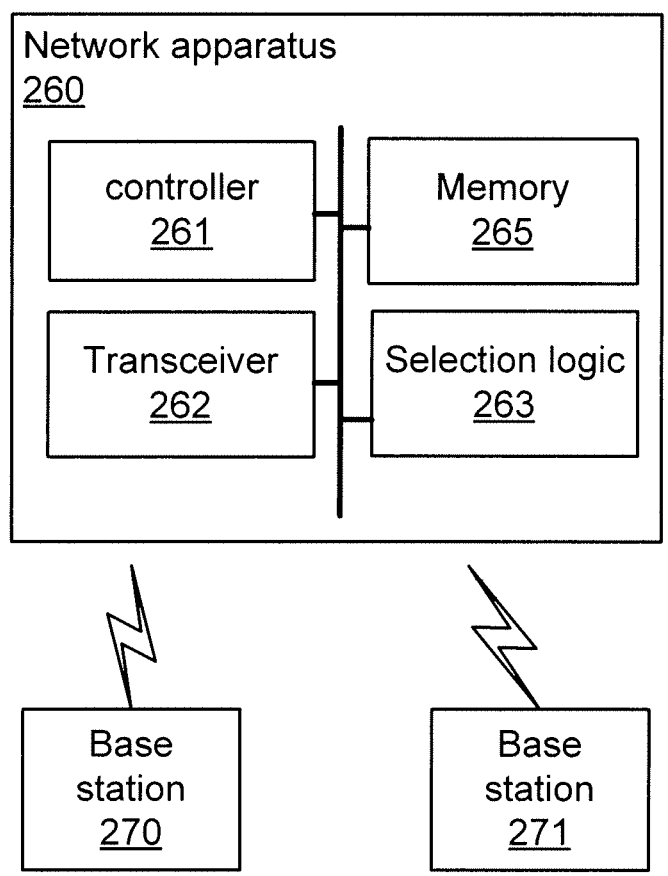
FIG. 2 shows a block diagram of a network apparatus in accordance with one embodiment of the invention.

FIG. 2 shows a block diagram of a network apparatus in accordance with one embodiment of the invention. Many related components such as data buses and peripherals have not been shown to avoid obscuring the invention. Referring to FIG. 2, in one embodiment, network apparatus 260 comprises controller 261, transceiver 262, memory 265, and selection logic 263. In one embodiment, network apparatus 260 communicates with base station 270 and base station 271.

In one embodiment, controller 261 monitors network parameters, such as, for example: SINR values with respect to different transmissions (of different base stations), approximate distances from base stations (for example via average path loss calculation), transmit power, and capacities of connections. In one embodiment, controller 261 controls operations of network apparatus 260. In one embodiment, memory 265 stores programs to be executed by controller 261.

In one embodiment, transceiver 262 includes physical (PHY) layer circuitry for communicating with the physical mediums (wireless or otherwise), media access control (MAC) layer circuitry, and higher-level layer (HLL) circuitry. In one embodiment, PHY layer circuitry, MAC layer circuitry, and HLL circuitry comprise functionality for both receiver and transmitter operations and include processing circuitry to evaluate communications from network apparatus 260, among other things. In one embodiment, transceiver 262 is connected to a core network, such as an Internet protocol (IP) network, via a wireless connection, a physical wired connection (e.g., electrical or fiber optic connection), or both.

In one embodiment, selection logic 263 selects base stations (e.g., base stations 270-271) based on two criteria. In one embodiment, a first criterion is based on a value indicative of maximum SINR (maxSINR) of signal received (e.g., downlink reference signal). A second criterion is based on minimum transmit power for an uplink transmission from network apparatus 260. In one embodiment, selection logic 263 selects a downlink transmission (to network apparatus 260) based on the first criterion and selects an uplink transmission based on the second criterion.

In one embodiment, network apparatus 260 comprises, for example, client devices and network points of attachments. In one embodiment, network apparatus 260 is fixed, stationary, or mobile depending on the particular environment or implementation and communicates over the medium of free space generally referred to as the "air interface" (e.g., wireless shared media).

In one embodiment, network apparatus 260 comprises wireless devices that comply with or operate in accordance with one or more protocols, such as, for example, WiFi, Bluetooth, UWB, WiMAX, and cellular protocols. Network apparatus 260 comprises, but is not necessarily limited to, a computer, server, workstation, laptop, ultra-laptop, handheld computer, telephone, cellular telephone, personal digital assistant (PDA), router, switch, bridge, hub, gateway, wireless device, multi-network, multiple integrated radio devices, mixed-network device supporting multiple concurrent radios, WiFi plus cellular telephone, portable digital music player, pager, two-way pager, mobile subscriber station, printer, camera, enhanced video and voice device, and any other one-way or two-way device capable of communicating with other devices or base stations. The embodiments are not limited in this context.

Figure 3:
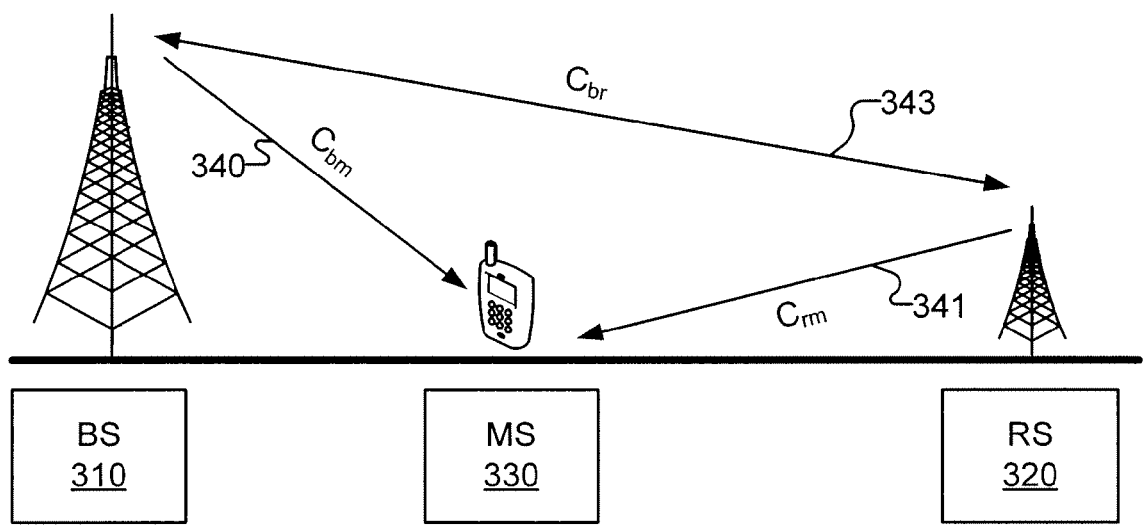
FIG. 3 is a block diagram showing costs of connectivity of a communication system in accordance with one embodiment of the invention.

FIG. 3 is a block diagram showing costs of connectivity of a communication system in accordance with one embodiment of the invention. Referring to FIG. 3, a communication system comprises base station 310, mobile station 330, and relay station 320. It will be appreciated by those of ordinary skill that other relay stations and base stations that present in the communication system are not shown to avoid obscuring embodiments of the present invention.

In a network that supports dual AP zone (DAZ), costs induced from additional hops via relay stations (e.g., 343) are determined with one of the following methods. In one embodiment, mobile station 330 selects to use a connection to base station 310 rather than a connection via relay station 320 to avoid the additional relay cost.

In one embodiment, a relay network is based on IEEE 802.16m where the delay of wireless backhaul connection (backbone connection) between base station 310 and relay station 320 is small and predictable. In addition, MAC coordination between base station 310 and relay station 320 is easily managed by base station 310 because base station 310 is a traffic aggregation point of all connected relay stations (including relay station 320).

Let $C_{bm}$ 340, $C_{rm}$ 341, and $C_{br}$ 341, be the capacity of a transmit/receive pair of base station 310/mobile station 330, relay station 320/mobile station 330, and base station 310/relay station 320, respectively. In one embodiment, a downlink cell boundary (i.e., downlink to mobile station 330) between base station 310 and relay station 320 is the position where the following equation is satisfied.

$$\frac{1}{C_{bm}} = \frac{1}{C_{br}} + \frac{1}{C_{rm}} \qquad (1)$$

In one embodiment, the inverse of capacity value $$\left(e.g., \frac{1}{C_{bm}}\right)$$

is the 1-bit transmission time of a connection. For example, $$\frac{1}{C_{bm}}$$

represents 1-bit transmission time of the connection between base station 310 and mobile station 330. In one embodiment, the 1-bit transmission time of a direct connection $$\left(\frac{1}{C_{bm}}\right)$$

and 1-bit transmission time of a connection going through relay station $$320\left(\frac{1}{C_{br}} + \frac{1}{C_{rm}}\right)$$

are approximately equal at the cell boundary.

Similarly, in determining an uplink cell boundary (i.e. uplink from mobile station 330) between base station 310 and relay station 320, let $C_{mb}$, $C_{mr}$, and $C_{rb}$ be the capacity for a transmit/receive pair of mobile station 330/base station 320, mobile station 330/relay station 320, and relay station 320/base station 310, respectively. In one embodiment, a cell boundary for the uplink transmission (from mobile station 330) is a position where the following equation is satisfied:

$$\frac{1}{C_{mb}} = \frac{1}{C_{mr}} + \frac{1}{C_{rb}} \qquad (2)$$

In one embodiment, base station 310 and relay station 330 are shared by multiple users. Equation (1) and equation (2) are modified to include load of each base station to improve temporally-fair scheduling. In the following equations, E(x) represents the expected value (average or min) of a sample. $N^d_b$ represents a number of mobile stations associated with base station 310 for a downlink transmission, whereas $N^d_r$ represents a number of mobile stations associated with relay station 320 for a downlink transmission. $N^u_b$ represents a number of mobile stations associated with base station 310 for an uplink transmission, whereas $N^u_r$ represents a number of mobile stations associated with relay station 320 for an uplink transmission.

In one embodiment, a cell boundary for the downlink transmission (to mobile station 330) is a position where the following equation is satisfied:

$$\frac{E[N^d_b + 1]}{C_{bm}} = \frac{E[N^d_r + 1]}{C_{br}} + \frac{E[N^d_r + 1]}{C_{rm}} \qquad (3)$$

In one embodiment, a cell boundary for the uplink transmission is a position where the following equation is satisfied:

$$\frac{E[N^u_b + 1]}{C_{mb}} = \frac{E[N^u_r + 1]}{C_{rb}} + \frac{E[N^u_r + 1]}{C_{mr}} \qquad (4)$$

In one embodiment, if N active mobile stations share a base station, the effective transmission time of a user increases by approximately N times because that user only uses 1/N fractional time. In one embodiment, (N+1) is used in equation (3) and (4) instead of N to reflect that this mobile station is a potential additional mobile station which is going to join the network.

Control and Signaling

In one embodiment, uplink and downlink communications are not fully independent of each other. For example, a mobile station is required to request for transmission slots from a base station (before sending data via an uplink transmission) in a cellular network. In one embodiment, a base station grants transmission slots by transmitting scheduling information to the mobile station via a downlink control channel. In one embodiment, if hybrid automatic repeat request (HARQ) is enabled, data transmission requires acknowledgement to be sent immediately to the opposite direction. Thus, good connectivity between neighboring base stations is important even if uplink/downlink base stations are two different base stations.

In one embodiment, efficient backbone communications (backhaul communication) among base stations is performed together with other advanced radio technologies, such as, for example, collaborative multi-point MIMO (multiple-input multiple-output) systems.

In one embodiment, transmission (e.g., in the downlink direction) regarding scheduling information for an uplink transmission is referred to herein as uplink control. In one embodiment, transmission regarding scheduling information for a downlink transmission is referred to herein as downlink control.

In one embodiment, all other transmission of control data via an uplink is referred to herein as uplink signaling. In one embodiment, uplink signaling includes, but is not limited to, ranging, HARQ feedback for downlink data, sounding, and channel quality indicator (CQI) channel feedback. In one embodiment, all other transmission of control data via a downlink is referred to herein as downlink signaling. In one embodiment, downlink signaling includes, but is not limited, system configuration broadcast and HARQ feedback for uplink data.

Figure 4A:
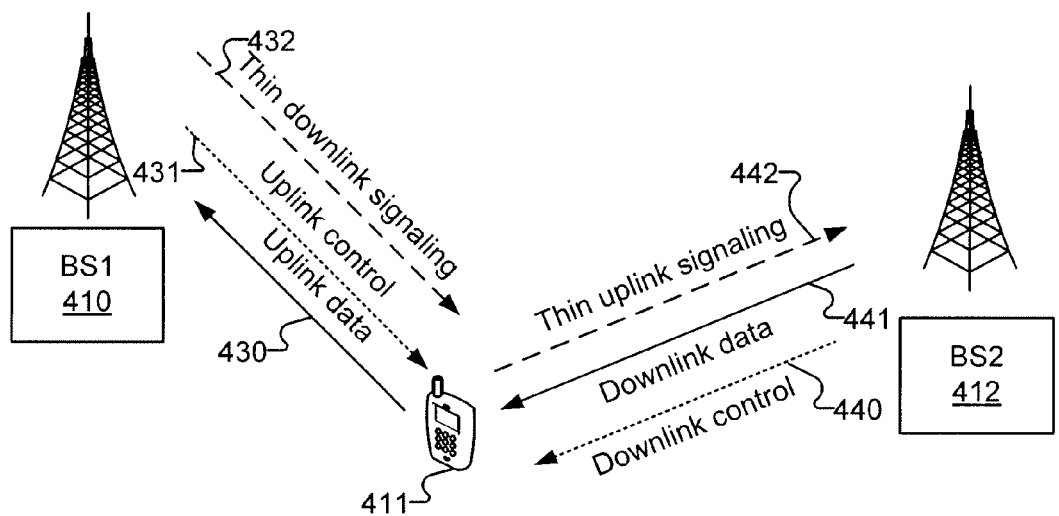
FIG. 4a shows an embodiment of a system communicating control data without using a backbone connection.

FIG. 4a shows an embodiment of a system communicating control/signaling data without using a backbone connection between two base stations. Referring to FIG. 4a, in one embodiment, the communication system comprises base station 410 base station 412, mobile station 411, and several links. In one embodiment, base station 412 is a base station. In one embodiment, mobile station 411 uses base station 410 as an uplink base station and uses base station 412 as a downlink base station.

In one embodiment, mobile station 411 maintains at least four links (two data links and two signaling links) with two base stations (i.e., base stations 410-411). Each signaling link is associated with a corresponding data link in a reverse direction.

In one embodiment, thin downlink signaling 432 and uplink control 431 data flows in a direction from base station 410 to mobile station 411. Uplink data 430 data flow in a direction from mobile station 411 towards base station 410. In one embodiment, thin uplink signaling 442 data flows in a direction from mobile station 411 towards base station 412.

Downlink data 441 and downlink control 440 data flow in a direction from base station 412 to mobile station 411.

In one embodiment, without a backbone connection, control/signaling data are transmitted without going through a relay station or a centralized system. In one embodiment, coordination is required to prevent multiple links (e.g., from mobile station 411 to base station 410) occur concurrently, because mobile station 411 operates at low transmit power and the uplink capacity is limited by the low transmit power.

Figure 4B:
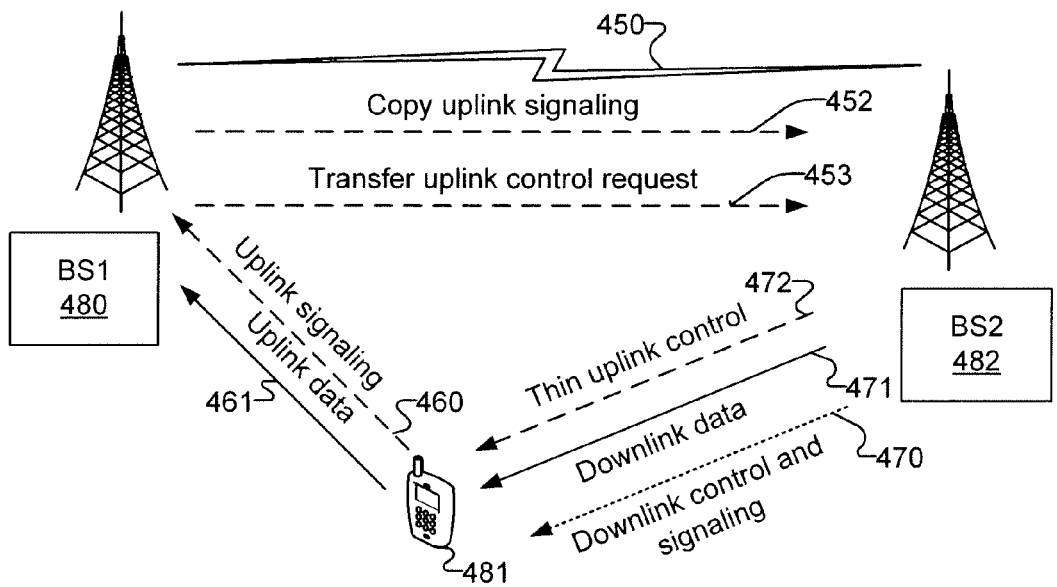
FIG. 4b is an embodiment of a system communicating control data with the use of a backbone connection.

FIG. 4b is an embodiment of a system communicating control data with the use of a backbone connection. Referring to FIG. 4b, in one embodiment, the communication system comprises base station 480, base station 482, mobile station 481, and several links. In one embodiment, base station 482 is a base station. In one embodiment, mobile station 481 uses base station 480 as an uplink base station and uses base station 482 as a downlink base station.

In one embodiment, mobile station 411 maintains at least two links and a backbone link (wired or wireless). Each link transmits data, signaling, control data, or any combination thereof.

In one embodiment, uplink signaling 460 and uplink data 461 share a link and the data flow in a direction from mobile station 481 to base station 480. In one embodiment, thin uplink control 472, downlink data 471, downlink control and signaling 470 share a link and the data flow in a direction from base station 482 to mobile station 411.

In one embodiment, in addition to the two links, there is a backbone connection 450 established from base station 480 to base station 482. In one embodiment, uplink control/signaling is transferred from uplink base station (i.e., base station 481) to downlink base station (i.e., base station 482) via backbone 450, which then transmits to mobile station 481 with a small penalty on latency. In one embodiment, backbone 450 is used to copy uplink signaling (452) and to transfer uplink control request (453), from base station 480 to base station 482.

In one embodiment, data that are timing critical (e.g., HARQ feedback) are more suitable to be transmitted using a communication system with respect to FIG. 4a. In one embodiment, data that are less timing critical (e.g., uplink scheduling information, CQI feedback, and uplink ranging) are transmitted using a communication system with respect to either FIG. 4a or FIG. 4b. In one embodiment, uplink scheduling information is managed at a base station or is coordinated among multiple base stations.

Figure 5:
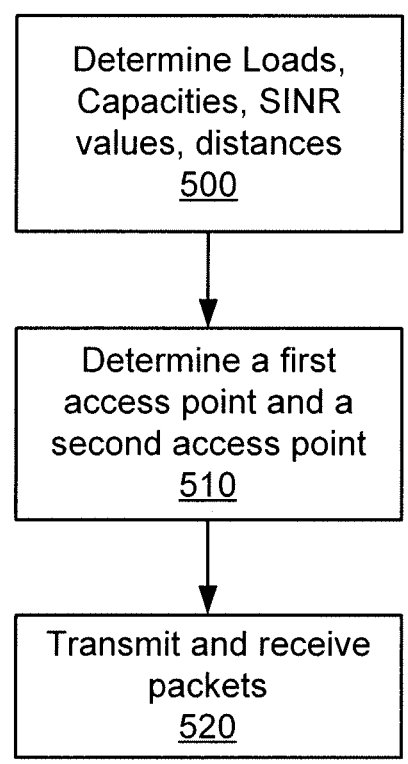
FIG. 5 is a flow diagram of one embodiment of a process to determine a base station for an uplink transmission and a base station for a downlink transmission.

FIG. 5 is a flow diagram of one embodiment of a process to determine a base station for sending data (uplink transmission) and a base station for receiving data (downlink transmission). The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus with respect to FIG. 2). In one embodiment, the process is performed by a computer system such as the computer system shown in FIG. 7.

Referring to FIG. 5, in one embodiment, processing logic begins by determining network parameters, such as, for example, load associated with a base station, distance associated with each base station, capacity of an connection (especially downlink capacity), and a SINR value associated with an connection (process block 500).

In one embodiment, processing logic selects base stations (a first base station and a second base station) based on two criteria related with the network parameters. In one embodiment, a first criterion is based on a value indicative of maximum SINR (maxSINR) of signal received. Processing logic determines a second criterion based on the minimum transmit power for an uplink transmission of a network device. In one embodiment, processing logic selects a downlink transmission based on the first criterion and selects an uplink transmission based on the second criterion (process block 510)

In one embodiment, processing logic establishes an uplink transmission and a downlink transmission with a first base station and a second base station respectively. In one embodiment, processing logic transmits and receives data via the uplink and downlink transmissions (process block 520).

Figure 6:
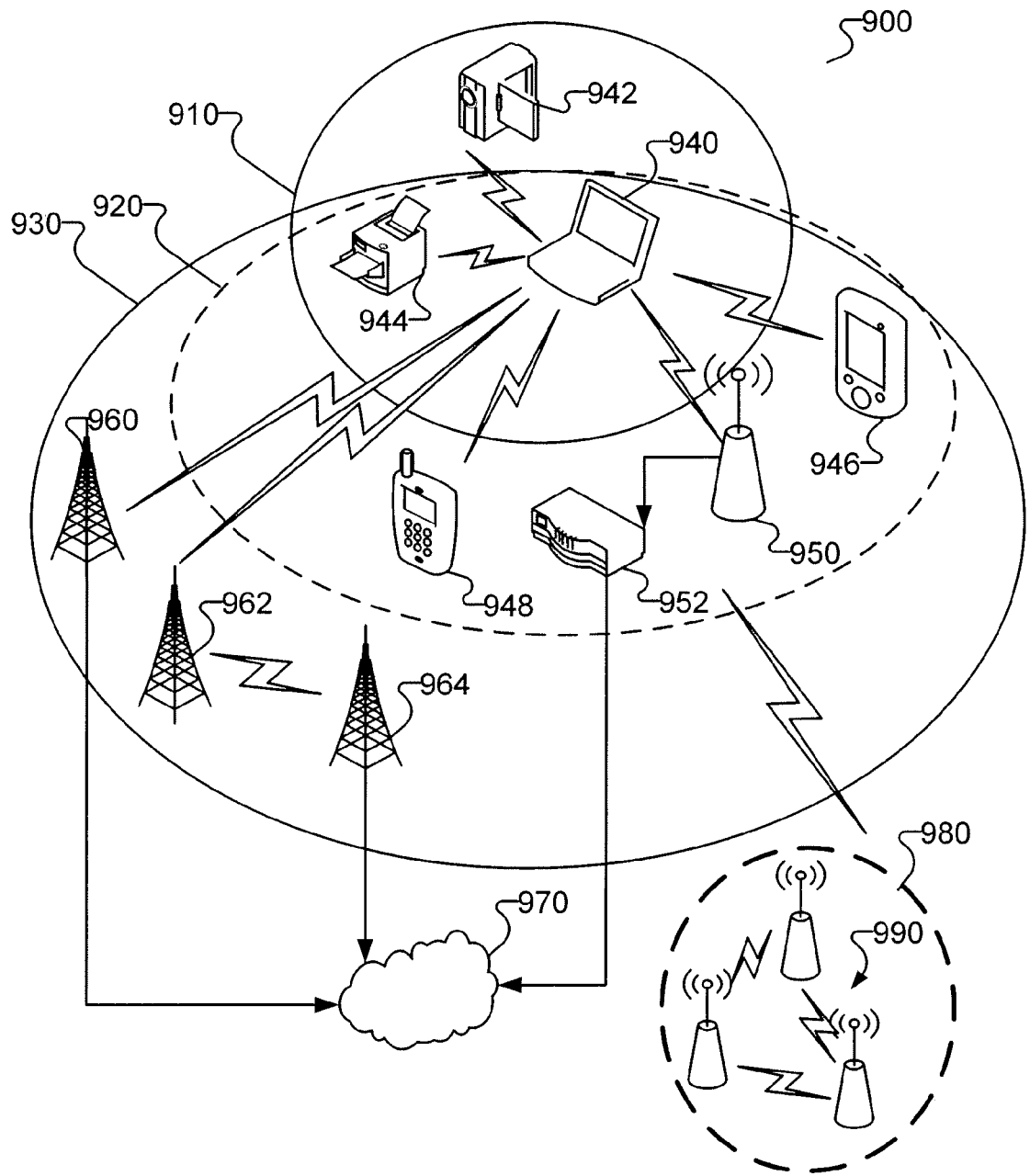
FIG. 6 is a diagram representation of a wireless communication system in accordance with one embodiment of the invention.

FIG. 6 is a diagram representation of a wireless communication system in accordance with one embodiment of the invention. Referring to FIG. 6, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards).

For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 6 depicts a WPAN, a WLAN, and a WMAN, In one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 7:
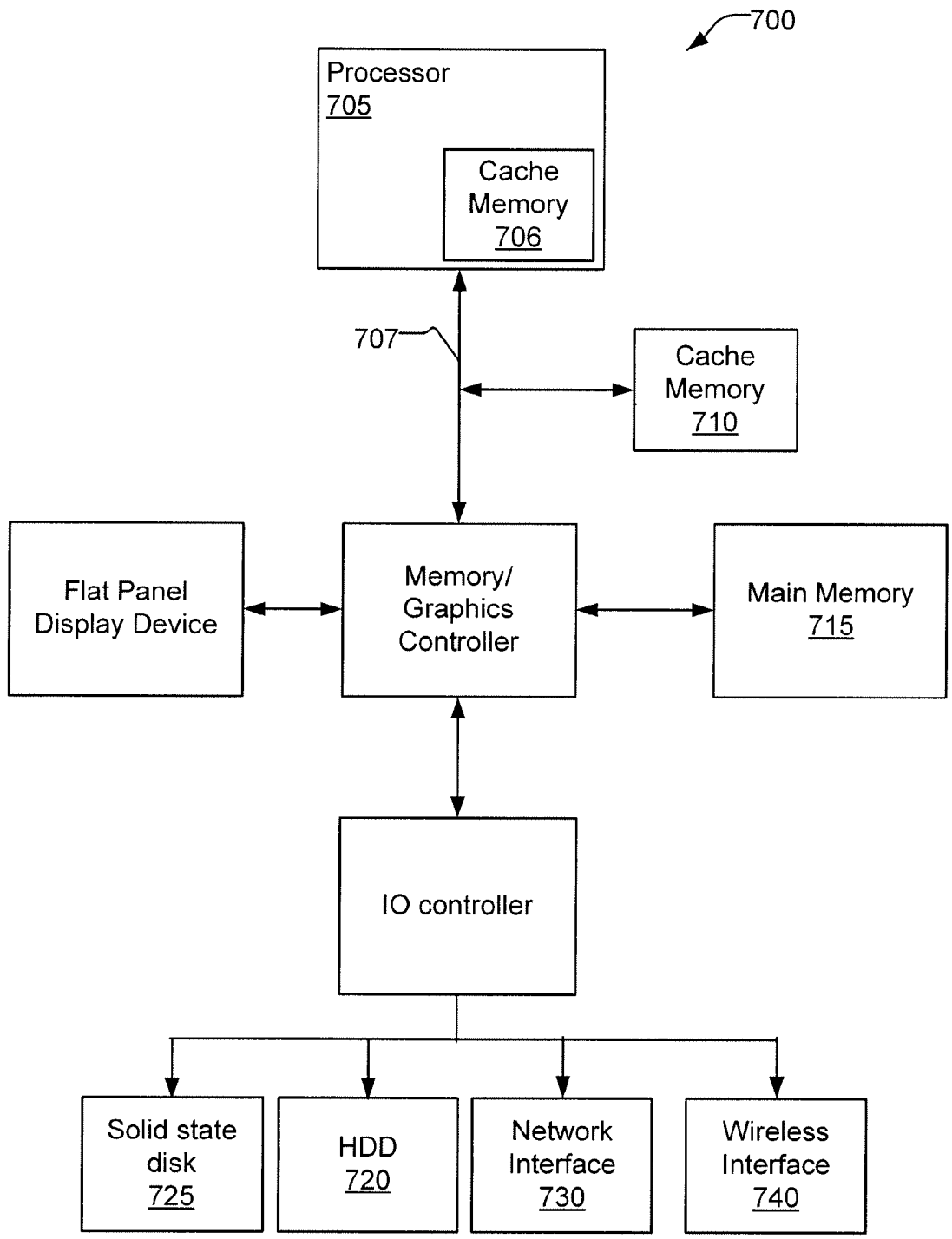
FIG. 7 illustrates a computer system for use with one embodiment of the present invention.

FIG. 7 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A mobile station comprising:
    a controller to determine a first base station to associate with for transmitting data, wherein the first base station is selected based at least in part on a minimum uplink transmit power metric, and to determine a second different base station to associate with for receiving data, wherein the second base station is selected based at least in part on a maximum downlink SINR metric; and
    a transceiver to transmit data to the first base station for uplink transmissions while associated with the first base station and the second base station and while an uplink power metric is lower for the first base station than for the second base station, and to receive data from the second base station for downlink transmissions while associated with the first base station and the second base station and while a downlink capacity metric is higher for the second base station than for the first base station;
    wherein the mobile station is capable to be associated simultaneously with the first base station for uplink transmissions but not downlink transmissions and the second base station for downlink transmissions but not uplink transmissions.

2. The mobile station of claim 1, further comprising selection logic to select the first base station if the first base station is closer to the mobile station than the second base station is.

3. The mobile station of claim 1, further comprising selection logic to select the first base station based at least on distances of each base station to the mobile station.

4. The mobile station of claim 1, further comprising selection logic to select the first base station based at least on transmission power required for transmitting data.

5. The mobile station of claim 1, further comprising selection logic to determine a downlink cell boundary based on
    a first value indicative of capacity of a first downlink from the first base station to the transceiver;
    a second value indicative of capacity of a second downlink from the second base station to the transceiver; and
    a third value indicative of capacity of a backhaul link from a third base station to the first base station, wherein the first base station is a relay station.

6. The mobile station of claim 5, wherein an inverse of the first value is equal to a sum of an inverse of the second value and an inverse of the third value, if the third base station is the second base station.

7. The mobile station of claim 5, wherein the selection logic determines the downlink cell boundary further based on
    a first average number of mobile stations associated with downlinks from the first base station; and
    a second average number of mobile stations associated with downlinks from the second base station.

8. The mobile station of claim 1, further comprising selection logic to determine an uplink cell boundary based on
    a first value indicative of capacity of a first uplink from the mobile station to the first base station;
    a second value indicative of capacity of a second uplink from the mobile station to the second base station; and
    a third value indicative of capacity of a backhaul link from the first base station to a third base station, wherein the first base station is a relay station.

9. A method comprising:
    selecting, based at least in part on a SINR measure, a first base station among a first plurality of base stations for receiving data, wherein the base station having a maximum SINR value for downlink transmissions is selected as the first base station from which to receive data in the downlink;
    selecting, based at least in part on a transmit power measure, a second base station among the first plurality of base stations for transmitting data, wherein the base station having a minimum uplink transmission power is selected as the second base station to which to transmit data in the uplink;
    associating with the first base station for the downlink but not for the uplink while the maximum SINR value for downlink transmissions is higher for the first base station than for the second base station;
    associating with the second base station for the uplink but not for the downlink while the transmit power measure for the second base station is lower for the second base station than for the first base station; and
    transmitting data to the second base station in the uplink while associated with the first base station, and receiving data from the first base station in the downlink while associated with the second base station.

10. The method of claim 9, wherein the SINR measure includes maximum SINR values, each maximum SINR value is associated with one of the plurality of base stations.

11. The method of claim 9, wherein the transmit power measure includes values of maximum transmit power values, each maximum transmit power value is associated with one of the plurality of base stations.

12. A method comprising:
- determining a first base station to transmit data over an uplink channel based on a first criterion, wherein the first criterion is based at least in part in a minimum uplink transmission power value;
- determining a second base station to receive data over a downlink channel based on a second criterion that is different from the first criterion, wherein the second criterion is based at least in part on a maximum downlink SINR value;
- transmitting data to the first base station over the uplink channel without being associated with the first base station for the downlink channel while the minimum uplink transmission power value is lower for the first base station than for the second base station; and
- receiving data from the second base station over the downlink channel without being associated with the second base station for the uplink channel while the maximum downlink SINR value is higher for the second base station than the first base station.

13. The method of claim 12, wherein the first criterion includes distances of each base station to the network adapter.

14. The method of claim 12, further comprising selecting the first base station based on data indicative of capacities and loads associated with channels, wherein the channels includes a backbone channel to a third base station if either the first or the second base station is a relay station.

15. The method of claim 12, further comprising determining a dual base stations (APs) zone in which the first base station and the second base station are used for the uplink channel and the downlink channel respectively.

16. The method of claim 12, further comprising
- establishing a first link, with a lower bandwidth than the uplink channel, to receive only first network control data from the first base station; and
- establishing a second link, with a lower bandwidth than the downlink channel, to transmit only second network control data to the second base station.

17. The method of claim 12, wherein network control data with respect to the uplink channel are relayed via the downlink channel from the second base station.

* * * * *